US010104460B2

(12) United States Patent
Boesen

(10) Patent No.: US 10,104,460 B2
(45) Date of Patent: Oct. 16, 2018

(54) VEHICLE WITH INTERACTION BETWEEN ENTERTAINMENT SYSTEMS AND WEARABLE DEVICES

(71) Applicant: BRAGI GmbH, München (DE)

(72) Inventor: Peter Vincent Boesen, München (DE)

(*) Notice: Subject to any disclaimer, the term of this patent is extended or adjusted under 35 U.S.C. 154(b) by 0 days.

(21) Appl. No.: 15/356,949

(22) Filed: Nov. 21, 2016

(65) Prior Publication Data

US 2017/0155997 A1    Jun. 1, 2017

Related U.S. Application Data

(60) Provisional application No. 62/260,440, filed on Nov. 27, 2015.

(51) Int. Cl.
| | | |
|---|---|---|
| H04B 5/00 | (2006.01) | |
| H04R 1/10 | (2006.01) | |
| H04W 76/02 | (2009.01) | |
| H04L 29/08 | (2006.01) | |
| H04R 27/00 | (2006.01) | |
| H04R 3/12 | (2006.01) | |
| G06F 3/16 | (2006.01) | |

(Continued)

(52) U.S. Cl.
CPC .......... *H04R 1/1041* (2013.01); *G06F 3/165* (2013.01); *G06F 17/30772* (2013.01); *H04L 67/12* (2013.01); *H04R 1/1016* (2013.01); *H04R 3/12* (2013.01); *H04R 27/00* (2013.01); *H04W 76/02* (2013.01); *H04W 76/10* (2018.02); *H04R 2420/07* (2013.01); *H04R 2499/13* (2013.01)

(58) Field of Classification Search
CPC . H04R 1/1041; G06F 3/165; G06F 17/30772; H04W 76/10
See application file for complete search history.

(56) References Cited

U.S. PATENT DOCUMENTS

| 3,934,100 A | 1/1976 | Harada |
|---|---|---|
| 4,150,262 A | 4/1979 | Ono |

(Continued)

FOREIGN PATENT DOCUMENTS

| CN | 204244472 U | 4/2015 |
|---|---|---|
| CN | 104837094 A | 8/2015 |

(Continued)

OTHER PUBLICATIONS

Announcing the $3,333,333 Stretch Goal (Feb. 24, 2014).

(Continued)

*Primary Examiner* — Simon King
(74) *Attorney, Agent, or Firm* — Goodhue, Coleman & Owens, P.C.

(57) ABSTRACT

A system includes a vehicle, a vehicle network disposed within the vehicle, and an entertainment system disposed within the vehicle wherein the entertainment system comprises at least one audio source. The entertainment system is configured to wirelessly communicate with at least one wireless earpiece to provide for streaming of audio to and from the at least one wireless earpiece. A method includes providing a vehicle having an entertainment system, wirelessly connecting the entertainment system of the vehicle to at least one wireless ear piece associated with an occupant within the vehicle, and streaming audio from the at least one wireless earpiece to the entertainment system of the vehicle.

11 Claims, 5 Drawing Sheets

(51) Int. Cl.
   *G06F 17/30* (2006.01)
   *H04W 76/10* (2018.01)

(56) References Cited

U.S. PATENT DOCUMENTS

| | | | |
|---|---|---|---|
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,041,410 A | 3/2000 | Hsu et al. |
| 6,048,324 A | 4/2000 | Socci et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,140,939 A | 10/2000 | Flick |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,275,789 B1 | 8/2001 | Moser et al. |
| 6,339,754 B1 | 1/2002 | Flanagan et al. |
| 6,408,081 B1 | 6/2002 | Boesen |
| D464,039 S | 10/2002 | Boesen |
| 6,470,893 B1 | 10/2002 | Boesen |
| 6,472,978 B1 | 10/2002 | Takagi et al. |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,983,628 B2 | 7/2011 | Boesen |
| 8,108,143 B1 | 1/2012 | Tester |
| 8,140,357 B1 | 3/2012 | Boesen |
| 8,610,585 B1 | 12/2013 | Kielbasa et al. |
| 8,855,918 B2 | 10/2014 | Ranford et al. |
| 8,994,498 B2 | 3/2015 | Agrafioti et al. |
| 9,037,125 B1 | 5/2015 | Kadous |
| 9,081,944 B2 | 7/2015 | Camacho et al. |
| 9,272,711 B1 | 3/2016 | Sivaraman |
| 9,510,159 B1 | 11/2016 | Cuddihy et al. |
| 9,638,537 B2 | 5/2017 | Abramson et al. |
| 9,741,010 B1 | 8/2017 | Heinla |
| 9,805,437 B2 | 10/2017 | Mun et al. |
| 9,869,556 B2 | 1/2018 | Jung et al. |
| 2001/0005197 A1 | 6/2001 | Mishra et al. |
| 2001/0025222 A1 | 9/2001 | Bechtolsheim et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0124968 A1 | 7/2004 | Inada et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2006/0220915 A1 | 10/2006 | Bauer |
| 2007/0127734 A1 | 6/2007 | Brulle-Drews |
| 2008/0001780 A1 | 1/2008 | Ohno et al. |
| 2008/0146890 A1 | 6/2008 | LeBoeuf et al. |
| 2008/0254780 A1 | 10/2008 | Kuhl et al. |
| 2009/0002197 A1 | 1/2009 | Cemper |
| 2009/0003620 A1 | 1/2009 | McKillop et al. |
| 2009/0128286 A1 | 5/2009 | Vitito |
| 2009/0191920 A1 | 7/2009 | Regen et al. |
| 2009/0238386 A1 | 9/2009 | Usher et al. |
| 2010/0033313 A1 | 2/2010 | Keady et al. |
| 2010/0210212 A1* | 8/2010 | Sato .................. H04B 5/02 455/41.3 |
| 2011/0090093 A1 | 4/2011 | Grimm et al. |
| 2011/0215921 A1 | 9/2011 | Ayed et al. |
| 2011/0227812 A1 | 9/2011 | Haddick et al. |
| 2012/0075168 A1 | 3/2012 | Osterhout et al. |
| 2012/0194418 A1 | 8/2012 | Osterhout et al. |
| 2013/0090744 A1 | 4/2013 | Tran |
| 2013/0322667 A1 | 12/2013 | Christensen |
| 2013/0329051 A1* | 12/2013 | Boesen .................. H04M 1/05 348/159 |
| 2014/0122092 A1* | 5/2014 | Goldstein ............... H04M 1/05 704/275 |
| 2014/0163771 A1* | 6/2014 | Demeniuk ............. H04B 1/082 701/2 |
| 2014/0185828 A1 | 7/2014 | Helbling |
| 2014/0270227 A1 | 9/2014 | Swanson |
| 2014/0309806 A1 | 10/2014 | Ricci |
| 2015/0028996 A1 | 1/2015 | Agrafioti et al. |
| 2015/0035685 A1 | 2/2015 | Strickland et al. |
| 2015/0057839 A1 | 2/2015 | Chang et al. |

(56) References Cited

U.S. PATENT DOCUMENTS

| | | |
|---|---|---|
| 2015/0066678 A1 | 3/2015 | Ogilvie |
| 2015/0095122 A1 | 4/2015 | Eramian |
| 2015/0095197 A1 | 4/2015 | Eramian |
| 2015/0095198 A1 | 4/2015 | Eramian |
| 2015/0148989 A1 | 5/2015 | Cooper et al. |
| 2015/0149042 A1* | 5/2015 | Cooper ................. B60R 16/037 701/48 |
| 2015/0243172 A1 | 8/2015 | Eskilson |
| 2015/0350413 A1 | 12/2015 | Ma et al. |
| 2015/0379859 A1 | 12/2015 | Nespolo |
| 2016/0001781 A1 | 1/2016 | Fung et al. |
| 2016/0016513 A1 | 1/2016 | Censo et al. |
| 2016/0033280 A1 | 2/2016 | Moore et al. |
| 2016/0061613 A1 | 3/2016 | Jung et al. |
| 2016/0069699 A1 | 3/2016 | Chen et al. |
| 2016/0125677 A1 | 5/2016 | Williams et al. |
| 2016/0169688 A1 | 6/2016 | Kweon et al. |
| 2016/0182757 A1 | 6/2016 | Yoo |
| 2016/0182762 A1 | 6/2016 | Eum |
| 2016/0191511 A1 | 6/2016 | Tijerina et al. |
| 2016/0210752 A1 | 7/2016 | Ratcliff et al. |
| 2016/0227009 A1 | 8/2016 | Kim et al. |
| 2016/0335454 A1 | 11/2016 | Choe et al. |
| 2017/0061751 A1 | 3/2017 | Loermann et al. |
| 2017/0094467 A1 | 3/2017 | Kiuchi et al. |
| 2017/0108346 A1 | 4/2017 | Cho et al. |
| 2017/0112671 A1 | 4/2017 | Goldstein |
| 2017/0151918 A1 | 6/2017 | Boesen |
| 2017/0153114 A1 | 6/2017 | Boesen |
| 2017/0153636 A1 | 6/2017 | Boesen |
| 2017/0206218 A1 | 7/2017 | Jai et al. |
| 2017/0208052 A1 | 7/2017 | Jai et al. |
| 2017/0208125 A1 | 7/2017 | Jai et al. |
| 2017/0228105 A1 | 8/2017 | Varadarajan |
| 2017/0289168 A1 | 10/2017 | Bar et al. |
| 2017/0357329 A1 | 12/2017 | Park et al. |
| 2017/0357381 A1 | 12/2017 | Santo et al. |
| 2017/0361133 A1 | 12/2017 | Yu et al. |
| 2018/0013897 A1 | 1/2018 | Kumar et al. |
| 2018/0017405 A1 | 1/2018 | Chen et al. |

FOREIGN PATENT DOCUMENTS

| | | |
|---|---|---|
| DE | 10253192 A1 | 5/2004 |
| DE | 10334203 A1 | 3/2005 |
| DE | 102010003429 A1 | 10/2011 |
| DE | 102011118966 A1 | 5/2013 |
| EP | 1017252 A2 | 7/2000 |
| EP | 1469659 A1 | 10/2004 |
| GB | 2074817 | 4/1981 |
| JP | 06292195 | 10/1998 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014043179 A2 | 3/2014 |
| WO | 2014046602 A1 | 3/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2017034287 A1 | 3/2017 |

OTHER PUBLICATIONS

BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, a Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI-Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, the Charger, the SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", the Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
International Search Report & Written Opinion, PCT/EP2016/078798 (dated Mar. 10, 2017).
Akkermans, "Acoustic Ear Recognition for Person Identification", Automatic Identification Advanced Technologies, 2005 pp. 219-223.
BMW, "BMW introduces BMW Connected—The personalized digital assistant", "http://bmwblog.com/2016/01/05/bmw-introduces-bmw-connected-the-personalized-digital-assistant", (Jan. 5, 2016).
Hyundai Motor America, "Hyundai Motor Company Introduces a Health + Mobility Concept for Wellness in Mobility", Fountain Valley, Californa (2017).
International Search Report & Written Opinion, PCT/EP16/78790 (dated Apr. 4, 2017).

(56) References Cited

OTHER PUBLICATIONS

International Search Report & Written Opinion, PCT/EP2016/078795 (dated Feb. 23, 2017).
International Search Report & Written Opinion, PCT/EP2016/078796 dated (Feb. 23, 2017).
International Search Report & Written Opinion, PCT/EP2016/078797 (dated Feb. 28, 2017).
International Search Report & Written Opinion, PCT/EP2016/078799 (dated Mar. 1, 2017).
International Search Report & Written Opinion, PCT/EP2016/078800 (dated Feb. 21, 2017).
International Search Report & Written Opinion, PCT/EP2016/078801 (dated Mar. 1, 2017).

* cited by examiner

VEHICLE WITH INTERACTION BETWEEN ENTERTAINMENT SYSTEMS AND WEARABLE DEVICES

PRIORITY STATEMENT

This application claims priority to U.S. Provisional Patent Application 62/260,440, filed on Nov. 27, 2015, and entitled Vehicle with interaction between entertainment systems and wearable devices, hereby incorporated by reference in its entirety.

FIELD OF THE INVENTION

The present invention relates to wearable devices and vehicles. More particularly, but not exclusively, the present invention relates to the interaction between one or more wearable earpieces and a vehicle's entertainment system.

BACKGROUND

Vehicles may come with various types of electronics packages. These packages may be standard or optional and include electronics associated with communications or entertainment. However, there are various problems and deficiencies with such offerings. What is needed are vehicles with improved electronics options which create, improve, or enhance overall experience of vehicles. In particular, what is needed are vehicles which integrate with wearable devices.

SUMMARY

Therefore, it is a primary object, feature, or advantage of the present invention to improve over the state of the art.

It is another object, feature, or advantage of the present invention to communicate between vehicle systems and wearable devices.

It is a further object, feature, or advantage of the present invention to use wearable devices within vehicles and to provide enhanced vehicle functionality.

It is another object, feature, or advantage of the present invention to enhance the entertainment system of a vehicle.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect a system includes a vehicle, a vehicle network disposed within the vehicle, and an entertainment system disposed within the vehicle wherein the entertainment system comprises at least one audio source. The entertainment system is configured to wirelessly communicate with at least one wireless earpiece to provide for streaming of audio to and from the at least one wireless earpiece. The entertainment system may be further configured to transfer audio files to the at least one wireless earpiece. The entertainment system may be further configured to transfer audio files from the at least one wireless earpiece. The entertainment system may be further configured to receive a playlist transferred from the at least one wireless earpiece and to perform an analysis of the playlist and determine one or more entertainment system settings based on the analysis. The settings may include radio station presets such as for satellite radio. The entertainment system may also be configured to send a playlist to the at least one wireless earpiece, to send audio preferences to the at least one wireless earpiece, and/or to receive audio preferences from the at least one wireless earpiece. The entertainment system may communicate with multiple sets of earpieces associated with multiple occupants within the vehicle such as to receive at least one playlist transferred from each of the multiple sets of ear pieces or to perform an analysis which combines each playlist from each of the multiple sets of ear pieces and determine one or more entertainment systems based on the analysis. The audio source may be a CD player, a DVD player, a FM radio, a television receiver, a satellite radio, a solid state memory containing audio files, a magnetic memory containing audio files, or any number of other audio sources.

According to another aspect, a method for providing entertainment to one or more occupants within a vehicle is provided. The method includes providing a vehicle having an entertainment system, wirelessly connecting the entertainment system of the vehicle to at least one wireless ear piece associated with an occupant within the vehicle, and streaming audio from the at least one wireless earpiece to the entertainment system of the vehicle. The method may further include transferring one or more audio files from the at least one wireless earpiece to the entertainment system of the vehicle, transferring one or more audio files from the entertainment system of the vehicle to the at least one wireless earpiece, communicating a playlist from the at least one wireless earpiece to the entertainment system of the vehicle, performing an analysis of the playlist and determining one or more entertainment system settings based on the analysis, or communicating a playlist from the entertainment system of the vehicle to the at least one wireless earpiece.

DETAILED DESCRIPTION

Some of the most important factors in selecting a vehicle such as car may be the technology available to enhance the experience. This may be of particular importance in certain vehicle segments such as for luxury vehicles. Another important factor in selecting a vehicle may be the available safety features. According to various aspects, the present invention allows for wearable devices including ear pieces to enhance the experience of vehicles and according to some aspects, the present invention allows for wearable devices such as earpieces to enhance the overall safety of the vehicle. Therefore, it is expected that the technology described herein will make any vehicle so equipped more desirable to customers, more satisfying to customers, and potentially more profitable for the vehicle manufacturer. Similarly at least some of the various aspects may be added to existing vehicles as after-market accessories to improve the safety or experience of existing vehicles.

Figure 1:
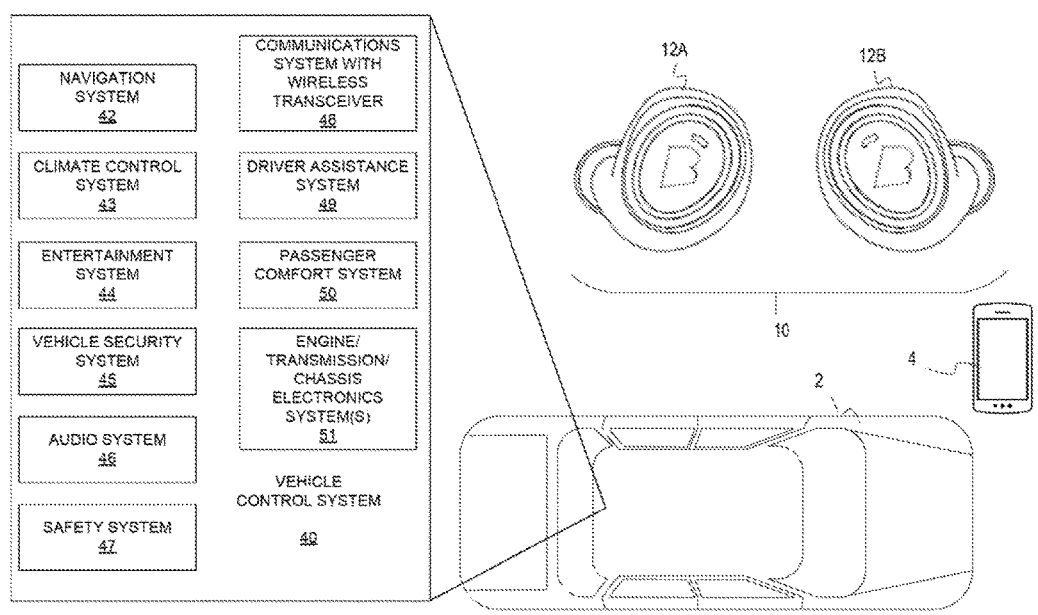
FIG. 1 illustrates one example of use of a wearable device in conjunction with a vehicle.

FIG. 1 illustrates one example of use of a wearable device in conjunction with a vehicle. A shown in FIG. 1 there is a vehicle 2. Although the vehicle shown is a full-size sedan, it is contemplated that the vehicle may be of any number of types of cars, trucks, sport utility vehicles, vans, mini-vans, automotive vehicles, commercial vehicles, agricultural vehicles, construction vehicles, specialty vehicles, recreational vehicles, buses, motorcycles, aircraft, boats, ships, yachts, spacecraft, or other types of vehicles. The vehicle may be gas-powered, diesel powered, electric, solar-powered, or human-powered. The vehicle may be actively operated by a driver or may be partially or completely autonomous or self-driving. The vehicle 2 may have a vehicle control system 40. The vehicle control system is a system which may include any number of mechanical and electromechanical subsystems. As shown in FIG. 1, such systems may include a navigation system 42, an entertainment system 44, a vehicle security system 45, an audio system 46, a safety system 47, a communications system 48 preferably with a wireless transceiver, a driver assistance system 49, a passenger comfort system 50, and an engine/transmission, chassis electronics system(s) 51. Of course, other examples of vehicle control sub-systems are contemplated. In addition, it is to be understood that there may be overlap between some of these different vehicle systems and the presence or absence of these vehicle systems as well as other vehicle systems may depend upon the type of vehicle, the type of fuel or propulsion system, the size of the vehicle, and other factors and variables. In the automotive context, examples of the driver assistance system 49 may include one or more subsystems such as a lane assist system, a speed assist system, a blind spot detection system, a park assist system, and an adaptive cruise control system. In the automotive context, examples of the passenger comfort system 50 may include one or more subsystems such as automatic climate control, electronic seat adjustment, automatic wipers, automatic headlamps, and automatic cooling. In the automotive context, examples of the safety system 47 may include active safety systems such as air bags, hill descent control, and an emergency brake assist system. Aspects of the navigation system 42, the entertainment system 44, the audio system 46, and the communications system 48 may be combined into an infotainment system.

One or more wearable devices such as a set of earpieces 10 including a left earpiece 12A and a right earpiece 12B may in operative communication with the vehicle control system 40 such as through the communication system 48. For example, the communication system 48 may provide a Bluetooth or BLE link to wearable devices or may otherwise provide for communications with the wearable devices preferably through wireless communications. The vehicle 2 may communicate with the wearable device(s) directly, or alternatively, or in addition, the vehicle 2 may communicate with the wearable device(s) through an intermediary device such as a mobile device 4 which may be a mobile phone, a tablet, or other type of mobile device.

As will be explained in further details with respect to various examples, the wearable device(s) 10 interact with the vehicle control system 40 in any number of different ways. For example, the wearable device(s) 10 may provide sensor data, identity information, stored information, streamed information, or other types of information to the vehicle. Based on this information, the vehicle may take any number of actions which may include one or more actions taken by the vehicle control system (or subsystems thereof). In addition, the vehicle 2 may communicate sensor data, identity information, stored information, streamed information or other types of information to the wearable device(s) 10.

Figure 2:
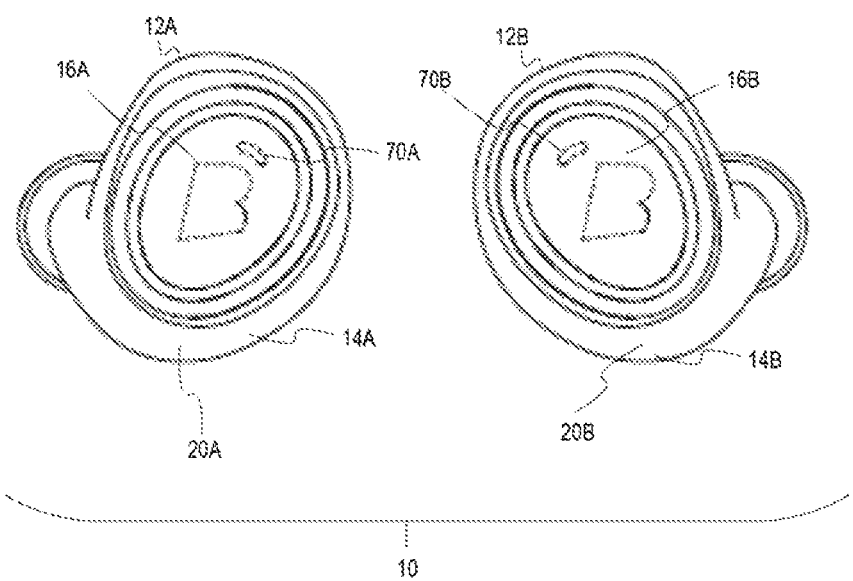
FIG. 2 illustrates a wearable device in the form of a set of ear pieces.

FIG. 2 illustrates one example of a wearable device in the form of a set of ear pieces 10 in greater detail. FIG. 1 illustrates a set of earpiece wearables 10 which includes a left earpiece 12A and a right earpiece 12B. Each of the earpieces wearables 12A, 12B has an earpiece wearable housing 14A, 14B which may be in the form of a protective shell or casing and may be an in-the-ear earpiece housing. A left infrared through ultraviolet spectrometer 16A and right infrared through ultraviolet spectrometer 16B is also shown. Each earpiece 12A, 12B may include one or more microphones 70A, 70B. Note that the air microphones 70A, 70B are outward facing such that the air microphones 70A, 70B may capture ambient environmental sound. It is to be understood that any number of microphones may be present including air conduction microphones, bone conduction microphones, or other audio sensors. Corona portions 20A, 20B may be present which provide lighting such as though a light pipe or guide from one or more light emitting diodes.

Figure 3:
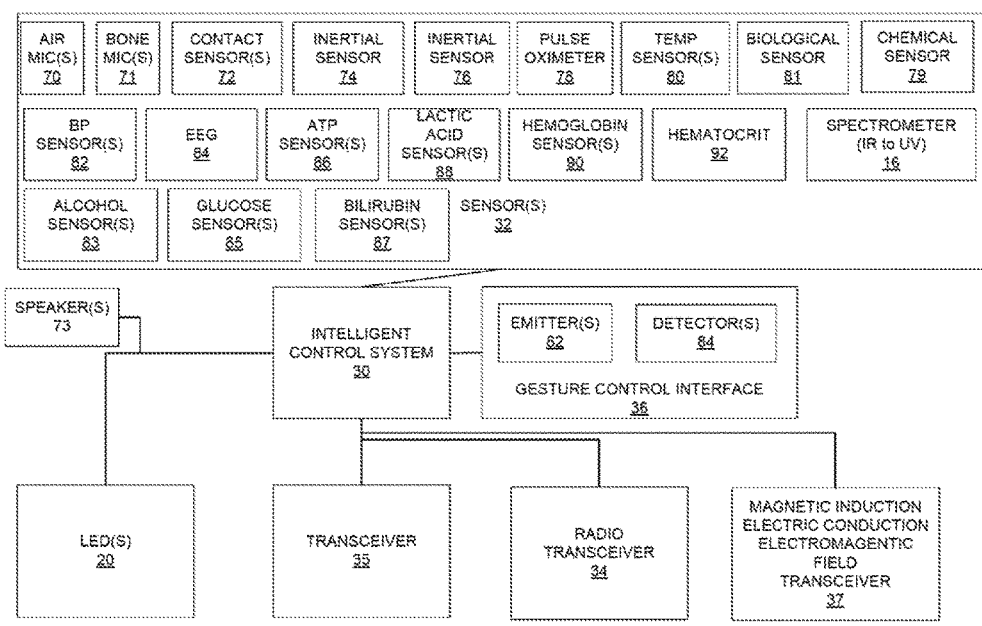
FIG. 3 is a block diagram illustrating a device.

FIG. 3 is a block diagram illustrating a device. The device may include one or more LEDs 20 electrically connected to an intelligent control system 30. The intelligent control system 30 may include one or more processors, microcontrollers, application specific integrated circuits, or other types of integrated circuits. The intelligent control system 30 may also be electrically connected to one or more sensors 32. Where the device is an earpiece, the sensor(s) may include an inertial sensor 74, another inertial sensor 76. Each inertial sensor 74, 76 may include an accelerometer, a gyro sensor or gyrometer, a magnetometer or other type of inertial sensor. The sensor(s) 32 may also include one or more contact sensors 72, one or more bone conduction microphones 71, one or more air conduction microphones 70, one or more chemical sensors 79, a pulse oximeter 76, a temperature sensor 80, or other physiological or biological sensor(s). Further examples of physiological or biological sensors include an alcohol sensor 83, glucose sensor 85, or bilirubin sensor 87. Other examples of physiological or biological sensors may also be included in the device. These may include a blood pressure sensor 82, an electroencephalogram (EEG) 84, an Adenosine Triphosphate (ATP) sensor, a lactic acid sensor 88, a hemoglobin sensor 90, a hematocrit sensor 92 or other biological or chemical sensor.

A spectrometer 16 is also shown. The spectrometer 16 may be an infrared (IR) through ultraviolet (UV) spectrometer although it is contemplated that any number of wavelengths in the infrared, visible, or ultraviolet spectrums may be detected. The spectrometer 16 is preferably adapted to measure environmental wavelengths for analysis and recommendations and thus preferably is located on or at the external facing side of the device.

A gesture control interface 36 is also operatively connected to or integrated into the intelligent control system 30. The gesture control interface 36 may include one or more emitters 82 and one or more detectors 84 for sensing user gestures. The emitters may be of any number of types including infrared LEDs. The device may include a transceiver 35 which may allow for induction transmissions such as through near field magnetic induction. A short range transceiver 34 using Bluetooth, BLE, UWB, or other means of radio communication may also be present. The short range transceiver 34 may be used to communicate with the vehicle control system. In operation, the intelligent control system 30 may be configured to convey different information using one or more of the LED(s) 20 based on context or mode of operation of the device. The various sensors 32, the intelligent control system 30, and other electronic components may be located on the printed circuit board of the device. One or more speakers 73 may also be operatively connected to the intelligent control system 30.

A magnetic induction electric conduction electromagnetic (E/M) field transceiver 37 or other type of electromagnetic field receiver is also operatively connected to the intelligent control system 30 to link the intelligent control system 30 to the electromagnetic field of the user. The use of the E/M transceiver 37 allows the device to link electromagnetically into a personal area network or body area network or other device.

Figure 4:
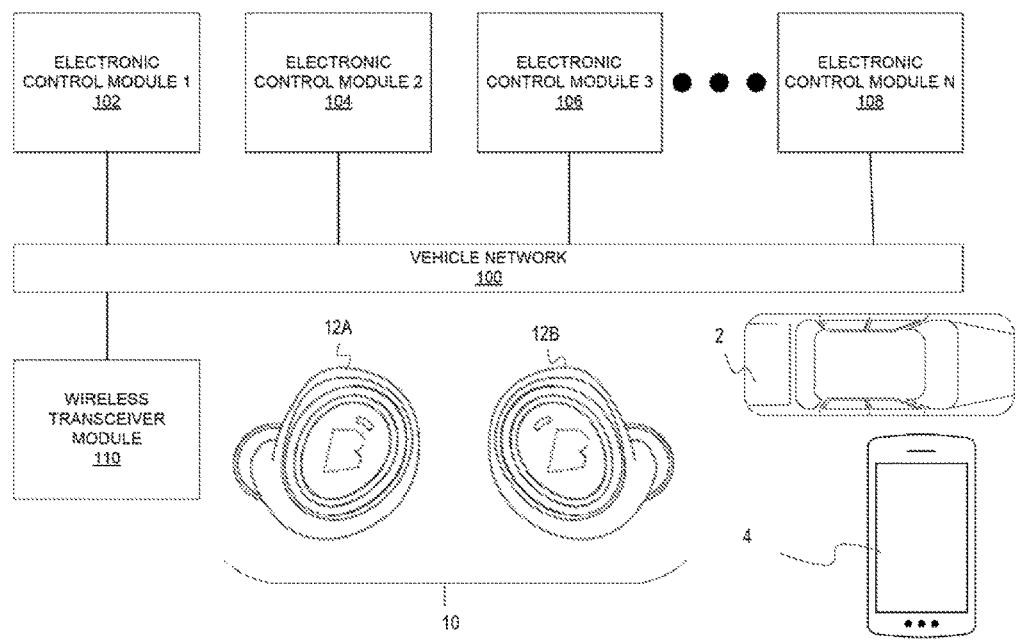
FIG. 4 illustrates a system which includes ear pieces in communication with a vehicle.

FIG. 4 illustrates another example of one or more wearable ear pieces in operative communication with a vehicle. In FIG. 4, a vehicle network 100 is shown. According to one aspect, the wearable devices 12A, 12B may communicate information through a vehicle network 100 associated with a vehicle 2. Data, instructions, commands, or audio streams may be communicated over the vehicle network 100 or vehicle bus to and from the wearable devices. Protocols which are used may include a Controller Area Network (CAN), Local Interconnect Network (LIN), or others including proprietary network protocols or network protocol overlays.

Various types of electronic control modules 102, 104, 106, 108 or electronic control units may communicate over the network 100 of the vehicle. These may include electronic modules such as an engine control unit (ECU), a transmission control unit (TCU), an anti-lock braking system (ABS), a body control module (BCM), a door control unit (DCU), an electric power steering control unit (PSCU), a human-machine interface (HMI), powertrain control module (PCM), speed control unit (SCU), telematic control unit (TCU), brake control unit (BCM), battery management system, entertainment system and numerous others. Any number of electronic control modules may be operatively connected to the vehicle network 100.

In one embodiment a wireless transceiver module 110 is operatively connected to a vehicle network 100 and it is the wireless transceiver module 110 which is in operative communication with one or more wearable devices such as wearable ear piece 12A, 12B.

Figure 5:
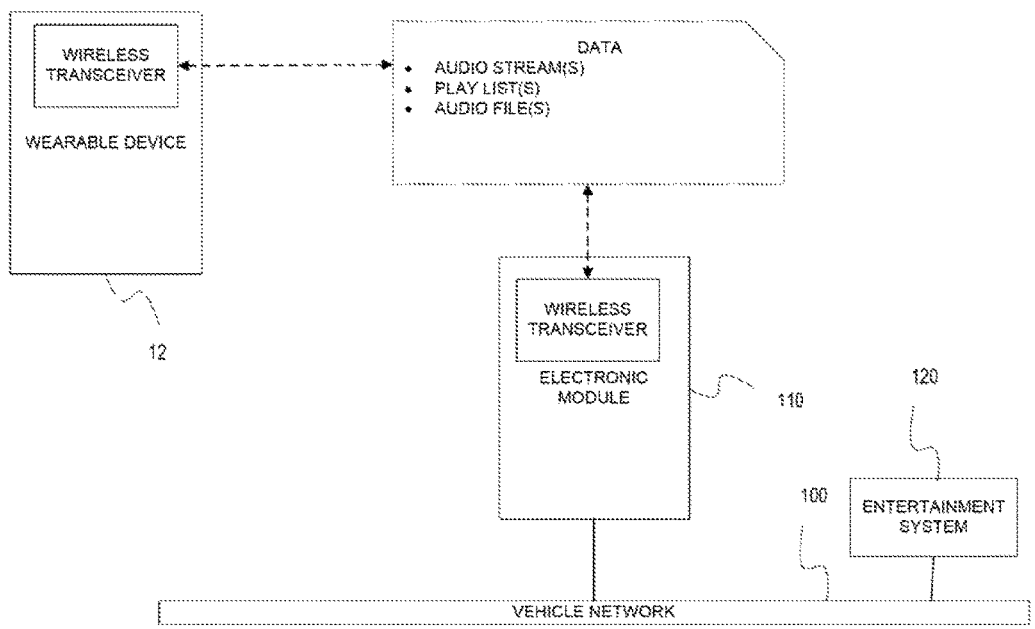
FIG. 5 illustrates a wearable device in communication with an entertainment system.

As shown in FIG. 5, one or more wearable devices 12 (including one or more ear pieces from one or more different vehicle occupants) may communicate with an entertainment system 120 of a vehicle. Although the communication may be performed directly between the entertainment system 120 and one or more ear pieces 12, in one embodiment a wireless transceiver module 110 may be operatively connected to the wearable ear piece 12 after the transceiver module 110 connects with or forms a wireless linkage with one or more of the ear pieces 12. The wireless transceiver module 110 may use any number of different types of communications and protocols including Bluetooth, Bluetooth Low Energy (BLE), ultra-wideband, Wi-Fi, or otherwise.

According to another aspect, there are various forms of interaction between the entertainment system of a vehicle and one or more wearable devices. One type of interaction involves the transfer of data including media such as audio or video data between the vehicle and the one or more wearable devices. It is contemplated that the entertainment system associated with the vehicle may have large amounts of storage available, larger than may be available to the wearable device(s). Thus, for example, suppose the earpieces have storage available for storing music, one or more audio files or playlists may be transferred from the vehicle to the earpiece. Alternatively, one or more audio files or playlists may be transferred from the earpiece to the vehicle. In addition, one or more audio files or playlists may be streamed from the entertainment system of the vehicle to the earpiece and one or more audio files or playlists may be streamed from the earpiece to the entertainment system of the vehicle.

It is also contemplated that by communicating playlists or lists of audio files back and forth between the entertainment system and one or more earpieces that information contained within the playlists or lists of audio files may be analyzed in various ways such as to identify genres or artists of particular interest to an occupant of the vehicle. Such information may be readily obtained as it may be stored within the playlist or as header information or otherwise within an audio file. Alternatively such information may be looked up from a local or remote database based on information which is readily identifiable and extractable from a playlist or audio file. Based on this information entertainment system settings may be set according to preferences of the occupant. For example, if all audio files within a playlist from an earpiece of an occupant of the vehicle are tagged as "Jazz", then in analyzing the playlist the entertainment system may determine that the occupant enjoys jazz music and may then arrange radio presets to favor jazz stations or presets or suggest jazz titles. Where multiple occupants are present within the vehicle each with their own earpieces, the entertainment system may obtain information from earpieces of all occupants and build a playlist such as one which includes music titles which all occupants listen to.

In addition, there may be one or more displays associated with the entertainment system of the vehicle. Where there are one or more displays associated with the entertainment system of the vehicle these may be used in conjunction with the wearable devices such as one or more earpieces. Thus, for example, the available audio files or music stored on the wearable devices may be displayed on the one or more displays associated with the entertainment system of the vehicle.

Various methods, system, and apparatus have been shown and described relating to vehicles with wearable integration or communication. The present invention is not to be limited to these specific examples but contemplates any number of related methods, system, and apparatus and these examples may vary based on the specific type of vehicle, the specific type of wearable device, and other considerations.

What is claimed is:

1. A system comprising:
    a vehicle;
    a vehicle network disposed within the vehicle; and
    an entertainment system disposed within the vehicle and operatively connected to the vehicle network, wherein the entertainment system comprises at least one audio source;
    wherein the entertainment system is configured to wirelessly communicate with multiple sets of wireless earpieces associated with multiple occupants within the vehicle to provide for streaming of audio to and from the multiple sets of the wireless earpieces;
    wherein each wireless earpiece of the multiple sets of wireless earpieces includes an intelligent control system and at least one sensor; and
    wherein the entertainment system is further configured to receive at least one playlist transferred from each of the multiple sets of wireless earpieces, perform an analysis which combines each playlist from each of the multiple sets of wireless earpieces and determine one or more entertainment system settings based on the analysis.

2. The system of claim 1 wherein the entertainment system is further configured to transfer audio files to each of the multiple sets of the wireless earpieces.

3. The system of claim 1 wherein the entertainment system is further configured to transfer audio files from each of the multiple sets of the wireless earpieces.

4. The system of claim 1 wherein the entertainment system is further configured to receive a playlist transferred from each of the multiple sets of the wireless earpieces.

5. The system of claim 4 wherein the entertainment system is configured to perform an analysis of the playlist and determine one or more entertainment system settings based on the analysis.

6. The system of claim 5 wherein the one or more entertainment system settings include radio station presets.

7. The system of claim 6 wherein the radio station presets are for satellite radio stations.

8. The system of claim 1 wherein the entertainment system is further configured to send a playlist to each of the multiple sets of the wireless earpieces.

9. The system of claim 1 wherein the entertainment system is further configured to send audio preferences to each of the multiple sets of the wireless earpieces.

10. The system of claim 1 wherein the entertainment system is further configured to receive audio preferences from each of the multiple sets of the wireless earpieces.

11. The system of claim 1 wherein the at least one audio source is selected from a set consisting of a CD player, a DVD player, a FM radio, a television receiver, a satellite radio, a solid state memory containing audio files, a magnetic memory containing audio files.

* * * * *